United States Patent [19]
Cameron et al.

[11] Patent Number: 5,635,062
[45] Date of Patent: Jun. 3, 1997

[54] DEVICE FOR FILTERING LIQUIDS AND A FILTER UNIT FOR USE IN SUCH A DEVICE

[75] Inventors: Paul Cameron, Taby; Jorgen Larsson, Saltsjo-Boo, both of Sweden

[73] Assignee: Celleco-Hedemora AB, Stockholm, Sweden

[21] Appl. No.: 492,093

[22] PCT Filed: Feb. 16, 1994

[86] PCT No.: PCT/SE94/00126

§ 371 Date: Sep. 11, 1995

§ 102(e) Date: Sep. 11, 1995

[87] PCT Pub. No.: WO94/19088

PCT Pub. Date: Sep. 1, 1994

[30] Foreign Application Priority Data

Feb. 18, 1993 [SE] Sweden .................................. 9300541

[51] Int. Cl.⁶ .................................................. B01D 33/23
[52] U.S. Cl. ......................... 210/232; 210/346; 210/331; 210/486; 210/492
[58] Field of Search ..................................... 210/232, 346, 210/347, 486, 487, 488, 490, 492, 331

[56] References Cited

U.S. PATENT DOCUMENTS

| | | |
|---|---|---|
| 2,821,305 | 1/1958 | Anderson . |
| 2,902,165 | 9/1959 | Imershein . |
| 3,193,105 | 7/1965 | Putnam . |
| 3,363,770 | 1/1968 | Glos . |
| 3,369,668 | 2/1968 | Glos . |
| 3,485,376 | 12/1969 | Peterson et al. . |
| 3,491,886 | 1/1970 | Glos . |
| 3,643,803 | 2/1972 | Glos . |
| 3,692,181 | 9/1972 | Davis . |
| 4,159,951 | 3/1979 | Davis . |
| 5,032,272 | 7/1991 | Mould . |

FOREIGN PATENT DOCUMENTS

| | | |
|---|---|---|
| 243684 | 3/1960 | Australia . |
| 234862 | 7/1960 | Australia . |
| 2455967 | 6/1976 | Germany . |
| 4218217 | 10/1992 | Germany . |
| 828568 | 2/1960 | United Kingdom . |
| 836086 | 6/1960 | United Kingdom . |
| 857929 | 1/1961 | United Kingdom . |
| 870769 | 6/1961 | United Kingdom . |
| 894318 | 4/1962 | United Kingdom . |
| 912436 | 12/1962 | United Kingdom . |
| 945065 | 12/1963 | United Kingdom . |
| 2029718 | 3/1980 | United Kingdom . |

*Primary Examiner*—Thomas M. Lithgow
*Attorney, Agent, or Firm*—Fish & Richardson P.C.

[57] ABSTRACT

Frames holding separate sections of a filter medium, each covering a section of the perforated sidewall of an annual disc of a device for filtering liquids are held in sealing arrangement with the sidewall by a circumferential holding system containing a circumferential groove engaging the frame, which in a preferred embodiment can be slidingly inserted and removed.

4 Claims, 2 Drawing Sheets

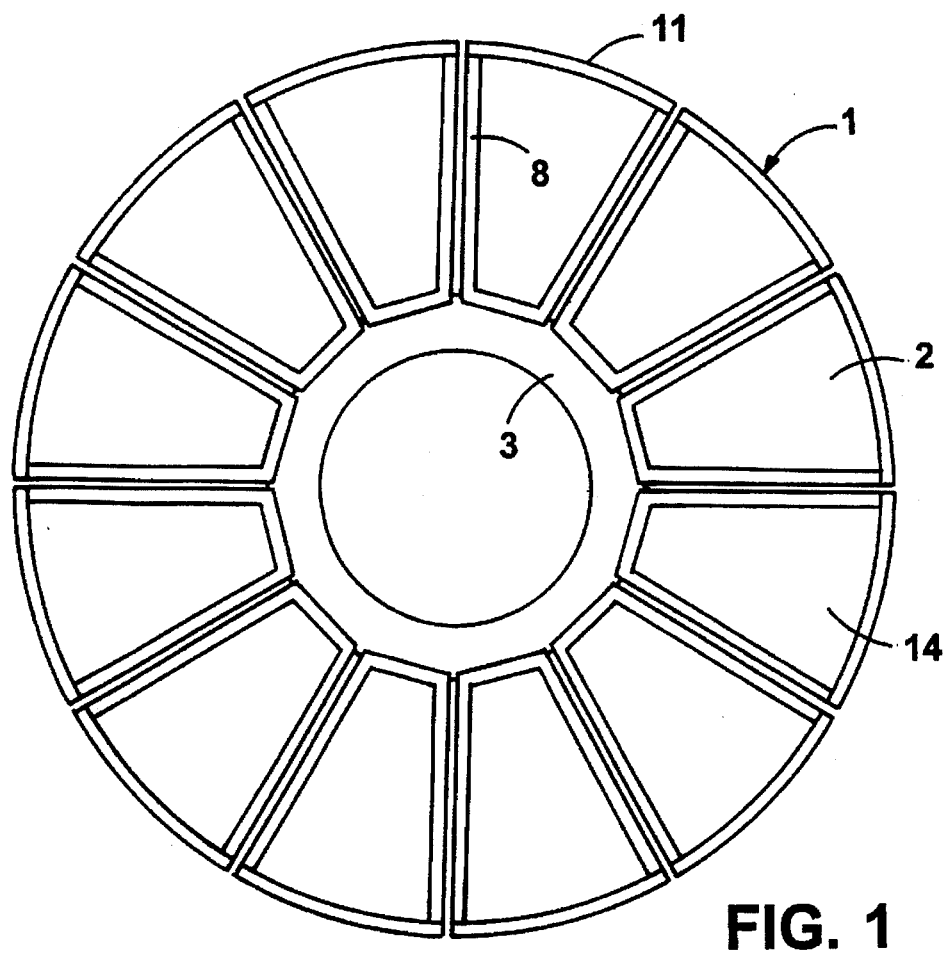
FIG. 1
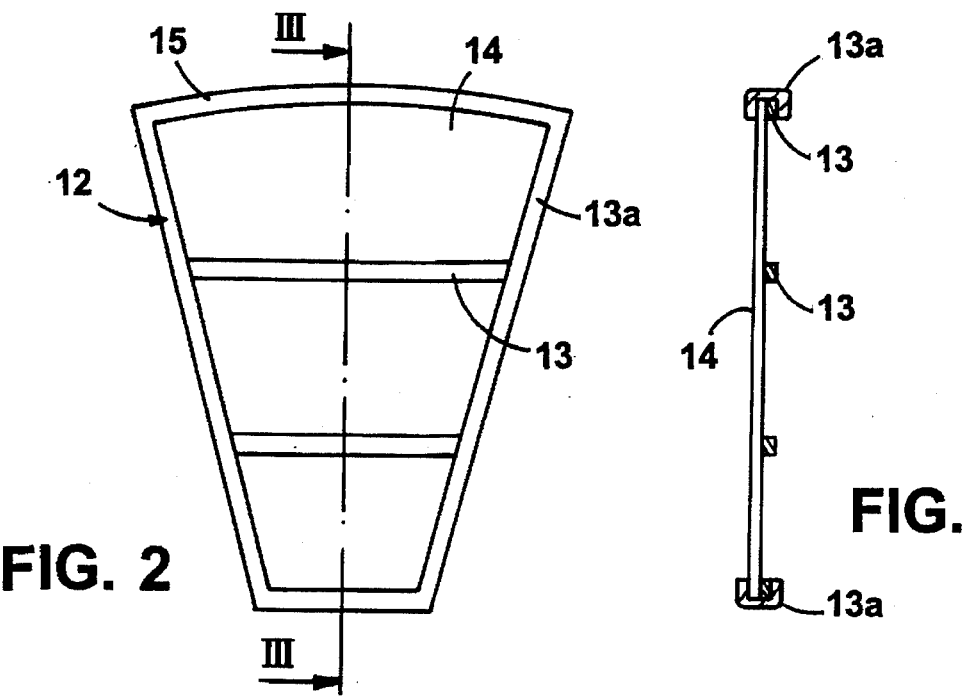
FIG. 2
FIG. 3

DEVICE FOR FILTERING LIQUIDS AND A FILTER UNIT FOR USE IN SUCH A DEVICE

BACKGROUND

The present invention relates to a device for filtering liquids, comprising an annular disc having two opposite annular side walls spaced from each other, at least one of the side walls being perforated, a plurality of separate sections of a filter medium, each of which covers a part of the perforated side wall, and frames onto which the respective sections of filter medium are applied.

The present invention also relates to a filter unit for use in such a device.

U.S. Pat. No. 3,363,770 discloses a filtering device of this kind, in which each section of filter medium is applied on a separate portion of the perforated wall of the same size as the section of filter medium. Each set of the section of filter medium and its associated perforated wall portion is slided into a frame-like holder on the disc. When exchanging a defective section of filter medium it is initially pushed out from the frame-like holder together with the associated perforated wall portion. Then, the defective section can be removed from its perforated wall portion. However, it is rather complicated to mount a new section of filter medium, since this usually comprises a flexible material, such as cloth, which can easily be dislodged from the intended position on its perforated wall portion, when the set of the new section of filter medium and its perforated wall portion is slided into the frame-like holder.

In current conventional disc filter devices, specifically for treating pulp suspensions, the side walls of the disc comprise several separate perforated wall portions arranged in series around the centre of the disc. The wall portions of one of the side walls of the disc are situated in front of the wall portions of the other side wall of the disc, so that pairs of opposite wall portions are formed. Each such pair of wall portions is enclosed by a filter bag formed from the filter medium, the pair of wall portions and the filter bag forming a sheet-shaped filter segment which is removable from the disc.

If the filter bag of any filter segment becomes defective it has to be exchanged for a new filter bag. To enable such an exchange of filter bags the entire filter segment has to be dismounted manually from the disc. Since the filter segments of these conventional devices may have a weight of up to about 30 kg/unit, it is a troublesome and heavy work to dismount and mount such filter segments. In addition, the work for exchanging defective filter bags is relatively time consuming, and consequently, the downtime costs in this connection are relatively high.

The object of the present invention is to provide a filtering device, which facilitates and permits a rapid exchange of defective parts of the filter medium. This object is obtained by means of a device of the kind stated initially, which is characterized in that the separate sections of filter medium are attached to the frames, such that each section and its frame form a filter unit separate from the perforated side wall, each filter unit being releasably connected to the disc. This has the advantage that a filter unit with a defective filter medium can be readily and quickly exchanged for a new filter unit. In comparison with the above described filter segments of current conventional devices the filter units according to the invention can be made subtantially lighter. In addition to this, the operation for exchanging the filter units according to the invention will be substantially less time consuming, as compared with the operation for exchanging conventional filter bags.

Preferably, the disc is provided with holding means, which engages with the filter units to keep them in intended positions relative to the disc, the holding means having separate parts engaging with radially outer ends of the filter units and being releasably attached to the disc. The holding means is arranged such that the filter units are displaceable substantially radially out from the disc, when said separate parts of the holding means are released from the disc.

In a device according to the invention, in which both side walls are perforated, the filter units are suitably orientated along the side walls, such that pairs of opposite filter units are formed. The radially outer ends of each pair of filter units are advantageously kept in place by one of said releasable parts of the holding means.

The invention also relates to a filter unit for use in the new invented device, the filter unit including a frame defining a filtering area, and a filter medium, which is attached to the frame and covers said filtering area.

BRIEF DESCRIPTION OF THE DRAWINGS

The invention is described in more detail in the following with reference to the accompanying drawing, in which FIG. 1 shows a disc of a device according to the invention, FIG. 2 shows a filter unit of the disc according to FIG. 1, FIG. 3 shows a section along the line III—III in FIG. 2.

PREFERRED EMBODIMENT OF THE INVENTION

Figure 4:
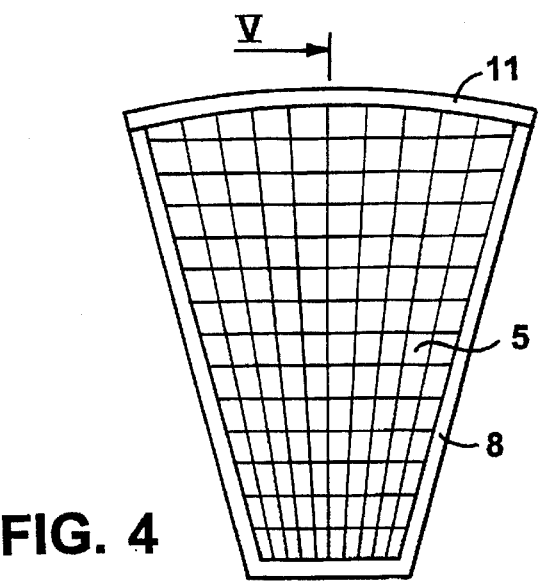
FIG. 4 shows a detail of the disc according to FIG. 1 without filter units.
Figure 5:
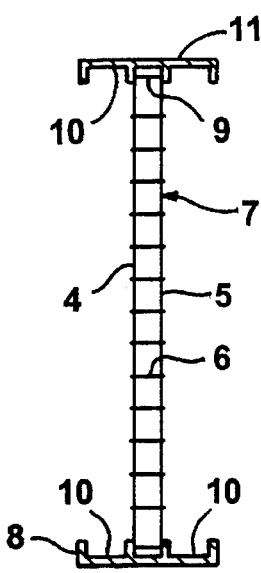
FIG. 5 shows a section along the line V—V in FIG. 4.

FIG. 1 shows a disc 1 of the invention having twelve similar filter members 2, which are attached to a tubular shaft 3 and are evenly spaced around the latter. Each filter member 2 has two opposite substantially plane grid walls 4 and 5, which are connected to each other by means of connection members 6, so that the grid walls 4, 5 and the connection members 6 form a stiff support unit 7. The connection members 6 keep the grid walls 4, 5 spaced from each other.

Each support unit 7 has the shape of a circle sector with a truncated tip and is provided with an elongated holding member 8, which extends along the radially directed edges and radially inner edge of the support unit 7. The holding member 8 is formed with a central groove 9, in which the support unit 7 extends. At mutual sides of the central groove 9 the holding member 8 is formed with a groove 10. A curved elongated holding member 11 having the same cross-section as the holding member 8 extends along the curved radially outer edge of the support unit 7 and is releasably attached to the support unit 7, for instance by means of screw joints (not shown in the drawing).

Figure 6:
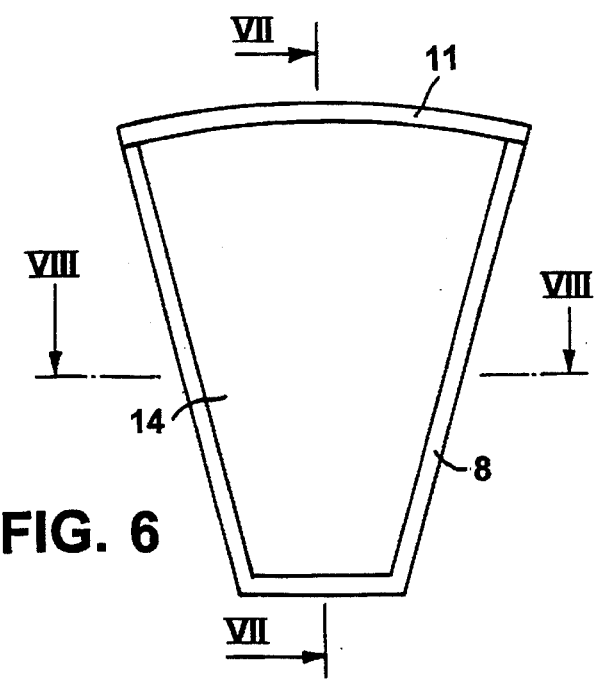
FIG. 6 shows the same detail as FIG. 4 but provided with filter units.
Figure 7:
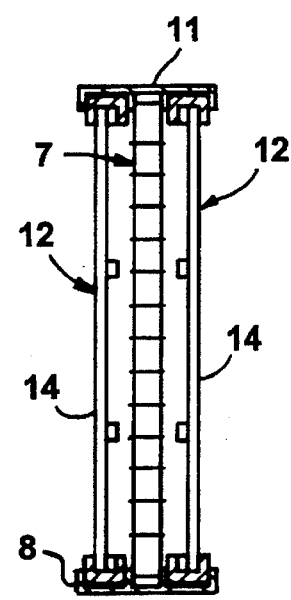
FIGS. 7 and 8 show sections along the lines VII—VII and VIII—VIII, respectively, in FIG. 6.
Figure 8:
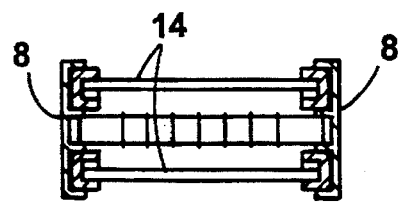

Separate identical filter units 12, each of which comprises a frame 13 having the same outer contour as the grid walls 4, 5, and a section 14 of a filter medium, which covers a filtering area defined by the frame 13 and is attached to the frame 13, are situated in front of the respective grid walls 4, 5. The radially extending ends and radially inner ends of the filter units 12 are situated in the grooves 10 of the holding members 8, whereas the curved radially outer ends 15 of the filter units are situated in the grooves 10 of the holding members 11 (FIG. 6–8). The sections 14 are suitably formed from straining cloths of metal or plastic. A gasket 13a of felt is folded over the edge of the filter unit 12 and extends along the periphery of the latter.

Normally the device according to the invention has several vertically orientated discs 1, which are arranged in parallel with each other and are rotatable about a common centre axis. During rotation of the discs 1 the filter members 2 pass through the liquid to be filtrated, so that filtrate passes through the sections 14 of filter medium and further through the grid walls 4, 5 into the support units 7. From the support units 7 the filtrate is conducted via axial pipes (not shown in the drawing) out of the device.

If any section 14 of the filter medium would become defective during operation the device is temporarily stopped and the holding member 11 which keeps in place the filter unit 12 with the defective section 14 is dismounted. The filter unit 12 with the defective section 14 is radially pulled out and away from the filter member 2 in question. Then, a new filter unit 12 is pushed in place on the filter member 2 with the aid of the grooves 10 of the holding members 8. Finally, the holding member 11 is mounted.

The capacity of the filter disc 1 may be adjusted by exchanging one or more of the filter units 12 for units of similar size but with the frames 13 covered with liquid impervious material.

We claim:

1. A device for filtering liquids, comprising:

(a) an annular disc having two opposite annular side walls spaced from each other, at least one of the side walls being perforated;

(b) a plurality of separate sections of a filter medium, each section of filter medium having an inner side facing said side wall and an outer side facing away from said side wall, said medium covers a radial portion of the perforated side wall of said annular disk;

(c) frames onto which the respective sections of filter medium are attached to form filter units separate from the side walls, each filter unit having a peripheral rim; and (d) holding means engaging the filter units to hold them in intended positions relative to the two oppose annular side walls, the holding means forming grooves receiving the entire length of said peripheral rim of each independent of said oppose annular wall.

2. A device according to claim 1, wherein said peripheral rim of each filter unit comprises a radially outer end relative to the disc and the holding means comprises separate holding members, which engage with the respective radially outer ends of the filter units and which are releasably attached to the disc.

3. A device according to claim 2, wherein said grooves of the holding means are disposed such that each filter unit is slidable along the grooves substantially radially out from the disc, when the separate holding member associated to the filter unit is released from the disc.

4. A device according to claim 3, wherein both side walls of the disc are perforated and the filter units are orientated along the side walls such that pairs of opposite filter units are formed, the radially outer ends of each pair of filter units being engaged by one of said separate holding members.

* * * * *